(12) United States Patent
Hechler et al.

(10) Patent No.: US 12,718,583 B2
(45) Date of Patent: Aug. 25, 2026

(54) METHOD FOR GENERATING A PERSPECTIVE-CORRECTED AND/OR TRIMMED OVERLAY FOR AN IMAGING SYSTEM OF A MOTOR VEHICLE

(71) Applicant: MOTHERSON INNOVATIONS COMPANY LIMITED, London (GB)

(72) Inventors: Lennart Hechler, Stuttgart (DE); Martin Schwalb, Stuttgart (DE); Firas Mualla, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 665 days.

(21) Appl. No.: 17/625,838

(22) PCT Filed: Jul. 22, 2020

(86) PCT No.: PCT/EP2020/070649

§ 371 (c)(1),
(2) Date: Jan. 10, 2022

(87) PCT Pub. No.: WO2021/013878

PCT Pub. Date: Jan. 28, 2021

(65) Prior Publication Data

US 2022/0262127 A1 Aug. 18, 2022

(30) Foreign Application Priority Data

Jul. 22, 2019 (DE) .................... 10 2019 119 788.0

(51) Int. Cl.

| | |
|---|---|
| ***G06V 20/58*** | (2022.01) |
| ***B60R 1/26*** | (2022.01) |

(Continued)

(52) U.S. Cl.

CPC ................ *G06V 20/58* (2022.01); *B60R 1/26* (2022.01); *B60R 1/31* (2022.01); *B60W 50/14* (2013.01);

(Continued)

(58) Field of Classification Search

CPC ........... B60R 1/31; B60R 1/26; B60W 50/14; B60W 2552/15; B60W 2050/146; B60W 2420/403; B60W 2510/20

See application file for complete search history.

(56) References Cited

U.S. PATENT DOCUMENTS

| | | | | |
|---|---|---|---|---|
| 2011/0307176 | A1* | 12/2011 | Sun | G08G 1/168 701/301 |
| 2018/0067494 | A1* | 3/2018 | Schiffmann | G06T 7/70 |

(Continued)

FOREIGN PATENT DOCUMENTS

| | | | |
|---|---|---|---|
| EP | 3291138 | A1 | 9/2018 |
| WO | WO 2010/114747 | A1 | 10/2010 |

OTHER PUBLICATIONS

German Office Action dated Jun. 4, 2020 of DE 10 2019 119 788.0.

(Continued)

*Primary Examiner* — Adnan M Mirza
(74) *Attorney, Agent, or Firm* — Jones Day

(57) ABSTRACT

The present invention relates to a computer-implemented method for generating a perspective-corrected overlay for an imaging system of a motor vehicle, to a method for generating a trimmed overlay for an imaging system of a motor vehicle, to devices for carrying out respective methods and to motor vehicles comprising an imaging system and such a device.

27 Claims, 5 Drawing Sheets

(51) Int. Cl.
*B60R 1/31* (2022.01)
*B60W 50/14* (2020.01)

(52) U.S. Cl.
CPC . *B60W 2050/146* (2013.01); *B60W 2420/403* (2013.01); *B60W 2510/20* (2013.01); *B60W 2552/15* (2020.02)

(56) References Cited

U.S. PATENT DOCUMENTS

| | | | | |
|---|---|---|---|---|
| 2019/0039518 | A1 | 2/2019 | Diessner | |
| 2019/0163989 | A1* | 5/2019 | Guo | G06F 18/251 |
| 2020/0160487 | A1* | 5/2020 | Kanzawa | G06V 20/56 |

OTHER PUBLICATIONS

Kelly et al., 2013, "Experimental validation of operator aids for high speed vehicle teleoperation", Experimental Robotics, STAR 88, 951-962.

Merenda et al., 2018, "Augmented reality interface design approaches for goal-directed and stimulus-driven driving tasks", IEEE Transactions on Visualization and Computer Graphics, 24(11):2875-2885.

International Search Report dated Oct. 8, 2020 of International application No. PCT/EP2020/070649.

Written Opinion dated Oct. 8, 2020 of International application No. PCT/EP2020/070649.

* cited by examiner

METHOD FOR GENERATING A PERSPECTIVE-CORRECTED AND/OR TRIMMED OVERLAY FOR AN IMAGING SYSTEM OF A MOTOR VEHICLE

CROSS-REFERENCE TO RELATED APPLICATION

This application is a National Stage Entry of International Patent Application No. PCT/EP2020/070649, filed on Jul. 22, 2020, which claims the benefit of priority to German Patent Application No. DE 10 2019 119 788.0, filed on Jul. 22, 2019, each of which is hereby incorporated by reference in its entirety for all purposes.

BACKGROUND

1. Field

The present invention relates to a computer-implemented method for generating a perspective-corrected and/or trimmed overlay for an imaging system of a motor vehicle, to devices for carrying out respective methods and to motor vehicles comprising an imaging system and such a device.

2. Related Art

Advanced Driver Assistance Systems (ADAS) become more and more standard in today's motor vehicles where they contribute to an improved safety of the driver and other passengers of the motor vehicle and of other participants in the road traffic. Among others, a rear view camera which continuously captures images of the environment to the rear of the vehicle during reverse driving is one example for such an ADAS. The respective images of the environment are displayed to the driver of the motor vehicle so that the driver is aware of for example obstacles located behind the motor vehicle on the vehicle's track. This in turn prevents the driver from hitting any object which is hidden by the motor vehicle or otherwise outside of the driver's field of vision. Especially such an ADAS supports in avoiding situations where persons are injured.

Within the captured image often further information is displayed to assist the driver. For example a respective warning of an impending collision between the vehicle and an obstacle might be displayed.

For example in DE 10 2008 049 113 A1 a method involving measuring a parking space by a set of distance-measuring sensors, and detecting an area of the parking space by a camera is disclosed. A picture representing the detected parking space is projected in an image of the camera. Further, a target lane computed for a parking process and an actual-lane are projected depending on implementation of a parking system.

In WO 2004/024498 A1 a vehicle environment device comprising a camera device and a sensor device is disclosed. The measuring results of the sensor device are combined with the camera image such that obstructions detected by the sensor system outside the field of vision of the camera are outputted in a suitable display.

Especially displaying the respective path of travel of the vehicle or the vehicle's wheels has been proven being a particular useful information for the driver when displayed as overlay on the captured image so to form a combined image during reverse driving. However such overlays are not useful in all situations or can in special situations even distract the driver. This is for example the case when the overlays are not shown in the correct position, with the consequence that based on such imperfect information the driver might make inappropriate decisions which may all the more lead to dangerous situations.

SUMMARY

Therefore, the invention aims at providing schemes which solve the aforementioned problems and improve the safety provided to the driver and other passengers of the vehicle as well as to other participants in the road traffic but at the same time are easy to implement and easy and intuitive to use during driving the motor vehicle.

The invention solves the problem according to a first aspect by a computer-implemented method for generating at least one perspective-corrected overlay for at least one 2D image representing an environment of a vehicle for at least one imaging system of the vehicle, comprising the steps of: Receiving 3D data of at least one part of the vehicle's environment represented in the 2D image; Determining, based at least on at least one steering angle of the vehicle, at least one predicted path of travel of the vehicle's wheels and which when displayed as overlay in the 2D image forms together with the 2D image a combined 2D image; Obtaining, based at least on the predicted path of travel, on at least the 2D image, on at least some of the 2D image data of the 2D image, on at least some of the 3D data and/or on the steering angle, at least one adapted path of travel, which corresponds to at least one perspective-corrected sub-section of the predicted path of travel and which when displayed as overlay in the 2D image appears to follow at least area by area at least one surface topography of the environment in the 2D image and/or appears to terminate, especially when following the topography of the environment in the 2D image, at at least one obstacle representing at least one boundary of at least one region impassable for the vehicle.

It is especially proposed that obtaining the adapted path of travel comprises the steps of: Fragmenting at least the sub-section of the predicted path of travel into at least two fragments; and Determining the adapted path of travel based at least on the 3D data associated at least implicitly via the 2D image and/or the respective 2D image data of the 2D image with at least one, preferably each fragment.

It is preferred that the step of fragmenting comprises the step of: Dividing the sub-section of the predicted path of travel or the entire predicted path of travel into at least two fragments, especially being equally-distributed across and/or along the predicted path of travel and/or being rectangular-shaped.

Alternatively or in addition it is also proposed that determining the adapted path of travel comprises the steps of: (i) Generating, at least virtually and/or in parts, the combined 2D image by combining the 2D image and the predicted path of travel in at least one combined image; and/or (ii) Determining, especially for each fragment, based at least on the combined 2D image and/or on the 2D image, at least one collection of 3D data corresponding to the part of the environment represented in the combined 2D image and/or in the 2D image, respectively, preferably enclosed by the boundaries of the fragment.

The inventive method might be furthermore alternatively or in addition characterized by the step of (i) Determining, especially for each fragment, based at least on the collection of 3D data, at least one averaged value of a certain property of the part of the environment corresponding to the collection of 3D data of that fragment; and/or (ii) Adapting, especially for each fragment, the shape and/or the location of the fragment, especially in the coordinate system of the 2D image and/or of the combined 2D image, preferably based at least on the averaged value, on the 3D data, on the location of the fragment, especially within the 2D image and/or combined 2D image, and/or on the extension of the fragment, preferably for creating the perspective-corrected appearance of the fragment when displayed as overlay in the 2D image.

Furthermore is alternatively or in addition proposed that the method comprises the steps of (i) Adapting, especially for each fragment, the shading of the fragment, especially the hue of the color of the fragment, preferably based on the averaged value, based on the location of the fragment within the adapted path of travel and/or based on the distance between the fragment and the vehicle in the 2D image and/or in the combined 2D image; and/or (ii) Repeating at least a part of the steps for each fragment, especially comprised by the sub-section of the predicted path of travel, unless all fragments have been processed and/or adapted so that the adapted path of travel is obtained.

Alternatively or in addition it is also preferred that determining the adapted path of travel further comprises the steps of Determining, especially for each fragment, at least one normal vector associated with the part of the environment corresponding to the collection of 3D data of that fragment, especially based on the collection of 3D data and/or the averaged value, respectively, of that fragment, and calculating at least one angle between the normal vector and a reference vector, especially the reference vector pointing in a direction corresponding to at least one light ray emanating from at least one light source, whereby preferably (i) the light source being a virtual light source, (ii) the light ray(s) emanating from the light source is/are directional light ray(s), (iii) the light source has a direction, (iv) the light source has a position above the scene shown in the 2D image, and/or (v) the light ray(s) has/have a direction aligned to at least one sunlight direction at a certain time, especially at the time of processing.

It is also proposed that alternatively or in addition the method comprises the step of Adapting, especially for each fragment, the shading of the fragment, especially the brightness of the color of the fragment, preferably based on the averaged value, based on the angle, especially based on the cosine of the angle, and/or within at least one range bounded by at least one minimum brightness value and/or at least one maximum brightness value.

Alternatively or in addition it is also preferred that wherein obtaining the adapted path of travel further comprises the step of determining the sub-section of the predicted path of travel, especially at least one start point of the sub-section of the predicted path of travel close to the vehicle and/or at least one end point of the sub-section of the predicted path of travel distant to the vehicle, especially based at least on the 3D data, the predicted path of travel and/or based on auxiliary data related to the environment, wherein especially (a) the start point of the sub-section of the predicted path of travel corresponds to the start point of the predicted path of travel, (b) the 3D data and the auxiliary data indicates obstacles in the environment possibly intersecting with the predicted path of travel, (c) the sub-section of the predicted path of travel, especially the end point, is determined based on the location of the first obstacle along the predicted path of travel from near to distant intersecting with the predicted path of travel, preferably at the location of the first obstacle intersecting with the predicted path of travel, (d) an obstacle is identified as intersecting with the predicted path of travel if the obstacle has at least one expansion, at least one height, at least one orientation and/or at least one location exceeding at least one predefined threshold value concerning, respectively, the expansion, the height, the orientation and the location and/or (e) the ground's slope, the angle of driving slope and/or the vehicle's ground clearance is taken into account for identifying an intersecting obstacle.

The invention furthermore proposes alternatively or in addition that obtaining the adapted path of travel further comprises the step of adapting the determined sub-section of the predicted path of travel based on object and/or scene classification relying on the 2D image data, the 3D data and/or the auxiliary data.

It is also preferred that the sub-section of the predicted path of travel is identical to the entire predicted path of travel; and/or the certain property of the part of the environment corresponding to the collection of 3D data, especially in the coordinate system of the 3D data, is at least one slope, especially with respect to at least one reference slope, at least one orientation, especially with respect to at least one reference orientation, at least one height, especially with respect to at least one reference height, at least one location, especially with respect to at least one reference location, and/or at least one expansion, respectively of the part of the environment.

The invention solves the problem according to a second aspect by a computer-implemented method for generating at least one trimmed overlay for at least one 2D image representing an environment of a vehicle for at least one imaging system of the vehicle, comprising the steps of: Receiving 3D data of at least one part of the vehicle's environment represented in the 2D image; Determining, based at least on at least one steering angle of the vehicle, at least one predicted path of travel of the vehicle's wheels and which when displayed as overlay in the 2D image forms together with the 2D image a combined 2D image; Obtaining, based at least on the predicted path of travel, on at least the 2D image, on at least some of the 2D image data of the 2D image, on at least some of the 3D data and/or on the steering angle, at least one adapted path of travel, which corresponds to at least one trimmed sub-section of the predicted path of travel and which when displayed as overlay in the 2D image appears to terminate at at least one obstacle representing at least one boundary of at least one region impassable for the vehicle.

It is especially proposed that obtaining the adapted path of travel comprises the steps of: Determining the sub-section of the predicted path of travel, especially at least one start point of the sub-section of the predicted path of travel close to the vehicle and/or at least one end point of the sub-section of the predicted path of travel distant to the vehicle, especially based at least on the 3D data and/or the predicted path of travel; wherein preferably the 3D data indicate obstacles in the environment possibly intersecting with the predicted path of travel and the sub-section of the predicted path of travel, especially the end point, is determined based on the location of the first obstacle along the predicted path of travel from near to distant intersecting with the predicted path of travel, preferably at the location of the first obstacle intersecting with the predicted path of travel.

Alternatively or in addition it is also preferred that the start point of the sub-section of the predicted path of travel corresponds to the start point of the predicted path of travel.

Furthermore it is alternatively or in addition proposed that an obstacle is identified as intersecting with the predicted path of travel if the obstacle has at least one expansion, at least one height, at least one orientation and/or at least one location exceeding at least one predefined threshold value concerning, respectively, the expansion, the height, the orientation and the location.

Preferred embodiments might be characterized in that the ground's slope, the angle of driving slope and/or the vehicle's ground clearance is taken into account for identifying an intersecting obstacle; and/or obtaining the adapted path of travel further comprises the step of adapting the determined sub-section of the predicted path of travel based on object and/or scene classification relying on the 2D image data, the 3D data and/or the auxiliary data.

Alternatively or in addition it is also preferred for the invention according to the first aspect and/or according to the second aspect that the method further comprises the step of: (i) Displaying the 2D image with the adapted path of travel as overlay, especially on at least one display unit of the vehicle, wherein the display unit especially comprises at least one monitor, at least one head-up display, at least one projector and/or at least one touch display and/or to the driver of the vehicle; and/or (ii) Displaying further at least one visualization of at least one end point of the adapted path of travel, especially the visualization being in form of at least one marking element, such as at least one line-shaped or rectangular-shaped overlay, which especially (a) is hugging the contour of the respective obstacle which defines the end of the adapted path of travel and/or (ii) is aligned with the most distant fragment of the adapted path of travel.

Alternatively or in addition it is also preferred that (i) the method further comprises the step of receiving the 2D image data and/or receiving the auxiliary data; (ii) the 2D image is represented by the 2D image data; (iii) the 2D image data is sampled 2D image data; (iv) the 3D data is sampled 3D data; (v) the auxiliary data is sampled auxiliary data; (vi) the 2D image data is received from at least one first data source; (vii) the 3D data is received from at least one second data source; (viii) the auxiliary data is received from at least one third data source; (ix) the 2D image data is associated with the respective 3D data, especially each sample of the sampled 2D image data is associated with at least one sample of the sampled 3D data; (x) at least one part of the auxiliary data is based on the 3D data or is identical to at least one part of the 3D data.

The invention especially proposes that the first data source, the second data source and/or the third data source comprise(s) at least in part (a) at least one time-of-flight (TOF) sensor, (b) at least one LIDAR sensor, (c) at least one ultrasonic sensor, (d) at least one radar sensor, (e) at least one camera sensor, especially in combination with evaluating the data of the camera sensor by means of at least one structure from motion approach, at least one scene classification approach and/or at least one object classification approach, (f) at least one stereo camera and/or (g) at least two camera sensors arranged for stereo vision, and/or at least two, preferably all, of the first, second and third data sources are at least partly identical.

It is especially preferred that the at least one part of the vehicle's environment represented in the 2D image is the environment to the rear or the front of the vehicle; and/or the steering angle is a current steering angle.

The invention solves the problem according to a third aspect by a data processing device comprising means for carrying out the steps of the method of any one of the preceding embodiments according to the first and/or second aspect of the invention.

The invention solves the problem according to a fourth aspect by a motor vehicle comprising at least one imaging system and a data processing device according to the third aspect of the invention.

Alternatively or in addition it is also preferred that the motor vehicle further comprises (a) at least one time-of-flight (TOF) sensor, (b) at least one LIDAR sensor, (c) at least one ultrasonic sensor, (d) at least one radar sensor, (e) at least one camera sensor, especially adapted to evaluate the data of the camera sensor by means of at least one structure from motion approach, at least one scene classification approach and/or at least one object classification approach, (f) at least one stereo camera, (g) at least two camera sensors arranged for stereo vision and/or (h) at least one display unit.

It has, thus, been surprisingly found with respect to the first aspect of the invention that incorporating 3D data of the environment of a vehicle, especially motor vehicle, allows to improve the representation of a predicted path of travel of the vehicle's wheels within a 2D image of the respective environment displayed to the driver. It is particularly the finding that the 3D data allows to consider the real ground topology of the environment, hence, adapting the predicted path of travel such that it appears to follow the topography of the environment. This in turn allows to dynamically adjust the predicted path of travel so that in every situation an accurate estimation of the path of travel in form of a respective overlay on the 2D image can be provided to the driver. Especially it is, thus, possible to show the overlay in the correct position and thus in turn allows the driver to easily recognize and interpret the contour of the displayed surrounding of the vehicle. For example when the ground is sloping or there is a curb, bump or other obstacle in the path of travel, the course of the overlay can be adapted appropriate in order to fit the topography of the environment which allows to making a reliable decision based on the display in contrast to systems of the state of the art in which the information provided in the 2D image are inconsistent with the information provided in the overlay showing a predicted path.

It has been proven a very promising approach to fragment the predicted path of travel and operate on each fragment individually. This allows to adapt each fragment with respect to especially its shading (which is meant to be especially the hue and the brightness, respectively, of the color of the fragment) and its shape. Adapting the fragment contributes to and/or essentially represents achieving the appearance of the adapted path of travel when used as overlay in a 2D image. According to the claimed subject-matter it has been found promising that the way of adapting the fragment in turn can be based on an averaged value of a collection of the 3D data. This allows incorporating the properties of the real environment (represented by the (samples of the) 3D data) for adapting the fragment in terms of shape and shade appropriate.

It is particularly useful in this regard, if information directed to the relationship between the predicted path of travel and the 2D image (and/or the respective 2D image data) is known or obtainable. For example it might be known or obtainable which section of the predicted path of travel would cover which part of the 2D image in case a combination of both in a combined 2D image would be carried out. Of course, it is not necessary (although still possible) that such a combined 2D image is actually created for the purpose of operating the proposed methods. It is sufficient that the aforementioned link between the predicted path of travel and the 2D image (data) on the one hand and the 2D image (data) and the 3D data on the other hand is known or obtainable. The knowledge about this relationship is referred to by the term "virtually combined 2D image" or "generating a virtually combined 2D image".

Still according to the first aspect of the invention it is in addition also possible that the adapted path of travel corresponds to a sub-section of the predicted path of travel. This preferred embodiment has been found promising in supporting the driver of the vehicle since this allows that the path of travel displayed as overlay in the 2D image terminates at an obstacle which has been detected in the environment of the vehicle and which is in the path of travel of the vehicle (e.g. during reverse driving). A respective sub-section of the predicted path of travel for further processing can be realized in an efficient way by using the 3D data which indicates obstacles and identifying such obstacles (if any) which crosses the predicted path of travel. By applying certain threshold values it is possible that only obstacles which indeed permits the vehicle to cross the obstacle are used for locating end points of the path of travel. For example the chassis clearance or ground clearance of the vehicle will not allow to the vehicle to cross the obstacle. For example the chassis clearance in front of the wheels might not be sufficient in the area of the spoiler or the rear valance before a wheel contacts the obstacle. Another situation would be that the crossing of the obstacle would lead to a hitting of the obstacle by the undercarriage between the axles due to a reduced width of the obstacle compared to the wheel base of the vehicle. Thus the intuitive understanding of the overlay by the driver, hence, avoiding critical situations where the overlay is misinterpreted, especially understanding the overlay to indicate that the obstacle might be crossed by the vehicle.

For example the ground's slope, the angle of driving slope and the vehicle's ground clearance and/or the result of an evaluation of obstacles present in the environment (and preferably the parameters of these obstacles, especially compared to threshold values) define, respectively, alone or in combination whether a region is passible or not and can accordingly also and optionally be used during the process of determining the adapted path of travel and/or further information.

It has been further found that, concerning the second aspect of the invention, it also already improves the understanding of a predicted path of travel displayed as overlay in a 2D image if only based on 3D data of the environment the predicted path of travel is terminated at an obstacle (which especially corresponds to choosing an appropriate sub-section as described with respect to the first aspect of the invention above) but without further adapting the appearance of the path of travel.

With respect to both aspects of the invention above (first aspect and second aspect of the invention above) it has also been found advantageous that a decision made with respect to the presence of an obstacle making the path impassable for the vehicle is made subject to a review. This review might be based on the same 3D data based on which already the sub-section of the predicted path of travel has been initially determined. But alternatively or in addition also further data such as auxiliary data might be incorporated. Such auxiliary data might be originating from another source than the 3D data do. Independent from the data source used, for the review it might be also possible that compared to the initial selection another approach (e.g. object classification and/or scene classification) for making the decision is chosen. This is particularly useful because such "another approach" might be computational more expensive than the one for initially determining the sub-section and, hence, it is required that this "another approach" is only executed in case there is any obstacle (especially one which is making the path impassable) present at all. But if there is at least one obstacle making the path impassable for the vehicle, the review of this decision can be operated on cost of more computational load.

This allow to change a previous decision from e.g. "impassable" to "passable" because during review it might turn out for example that the initially detected obstacle is only grass which makes the path not impassable for the vehicle at all.

With respect to both aspects of the invention above (first aspect and second aspect of the invention above) it is further the surprising finding that optionally highlighting the obstacles where the adapted path of travel terminates might improve the reliability of the ADAS and also the understanding of the driver. Highlighting the obstacles can be for example accomplished by displaying a respective rectangular or a line-shaped marking element as overlay, especially which marking element follows the obstacle or at least some edge and/or curvature of the obstacle.

The invention according to the first and second aspect can be used preferably in a vision system for vehicles which includes a sensor system which provides 3D data and a 2D image (e.g. a color 2D image). The sensor system may comprise two separate sensors for, respectively, the 3D data and the 2D image. But also a common sensor for both, the 3D data and the 2D image, is possible. Accordingly, the data processed in the methods (3D data, 2D image data, auxiliary data) might have same or different sources. Especially the following setups have been identified as being appropriate for the purpose described in this application (while other setups may exist):

1. One time of flight (TOF) sensor for 3D and 2D data.
2. One TOF sensor for 3D and camera sensor for 2D data.
3. Two camera sensors (stereo vision) for both 2D and 3D data.
4. One camera sensor (in combination with structure from motion) for both 2D and 3D data.
5. One camera sensor (in combination with scene and/or object classification) for both 2D and 3D data.
6. One or more ultrasonic sensor(s) for 3D data and one camera sensor for 2D data.
7. One Lidar sensor for 3D data and one camera sensor for 2D data.
8. One radar sensor for 3D data and one camera sensor for 2D data.

It has been found particularly useful if the extrinsic positions and orientations of all deployed sensors are known, especially with reference to each other and/or with reference to the vehicle. A respective system may also include one or more devices (or hardware in general) for running the software that processes all acquired data. The system might also adapted to receive signals from the vehicle like e.g. the current steering angle. The sensors preferably are mounted in a way that obstacles higher than the vehicle's ground clearance are reliably detected.

To sum up, the incorporation and/or combination of 2D image data, 3D data and/or auxiliary data allows to provide an improved appearance (e.g. shading, shaping, three dimensional appearance and/or terminating) of a path of travel (i.e. steering lines) when displayed as overlay in a 2D image.

A respective preferred sensor system may be described as follows (while there are still lots of variations possible): A respective sensor system may acquire 3D information and 2D color image data of the scene which are transferred to the software. The extrinsic positions and orientations of all deployed sensors may be known. The software might determine the predicted path of travel of the vehicle's wheels by means of the current steering angle. This predicted path of travel might be for instance longitudinally fragmented equally into quadrangular regions. The sampled 3D points associated with these regions are averaged to obtain an averaged value. For each fragment a surface normal (of the corresponding environment) might be calculated. The structure-based shading of the fragment might be displayed in different ways. For instance, the cosine of the angle between light direction and surface normal might be proportional to the brightness of the color that will be used to shade this fragment (Lambert's cosine law). For all used colors there might be a minimum and a maximum brightness level defined. The actually used brightness level might be defined by the cosine of the aforementioned angle. The hue of the used color might depend on the distance of the shaded region to the vehicle. The resulting shaded (colored) region might be projected onto the 2D image data which is sent to the display device.

BRIEF DESCRIPTION OF THE DRAWINGS

The following drawings show aspects of the invention for improving the understanding of the invention in connection with some exemplary illustrations, wherein.

DETAILED DESCRIPTION

Figure 1:
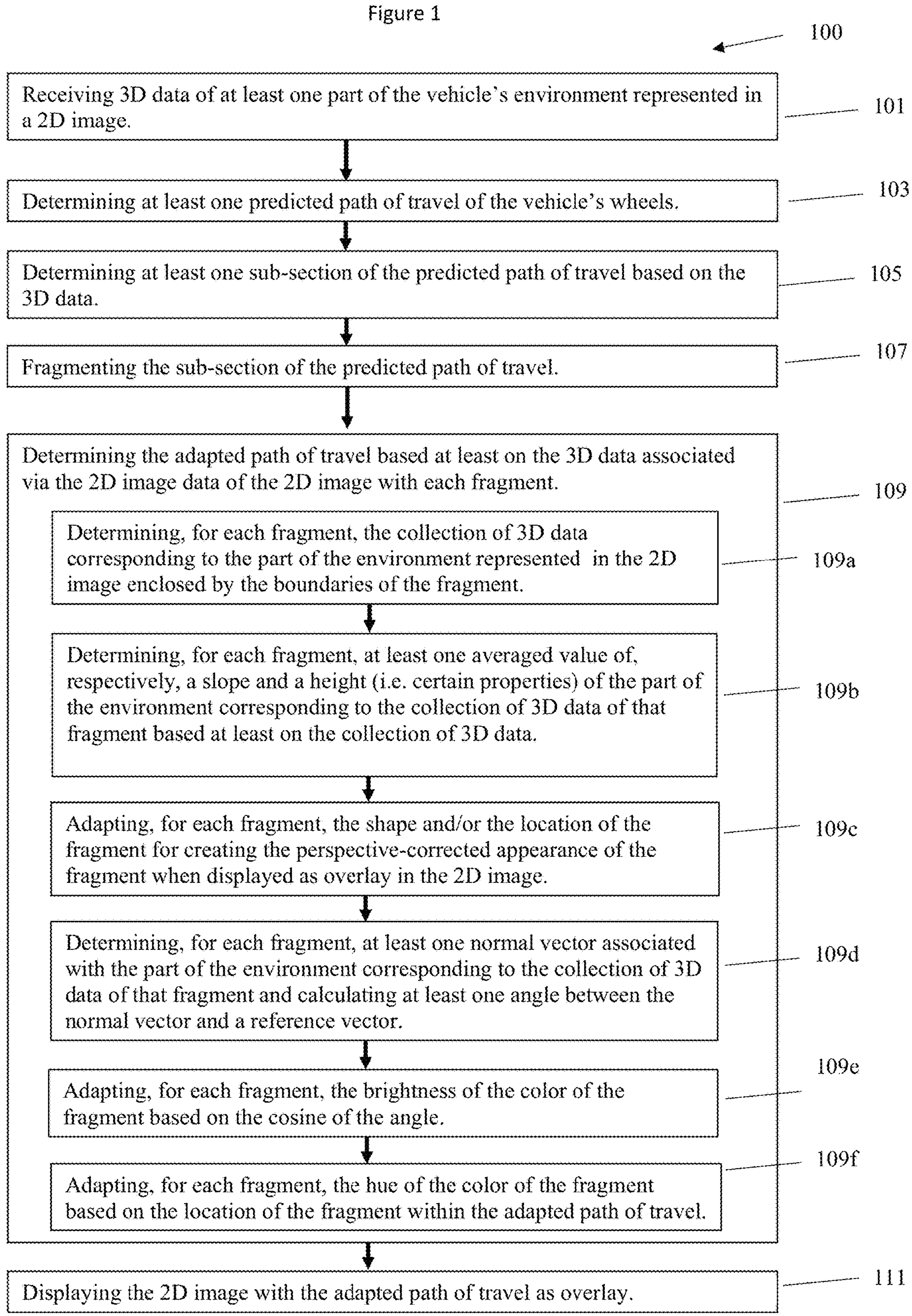
FIG. 1 shows a flow chart of a method according to the first aspect of the invention.

FIG. 1 shows a flow chart 100 for a computer-implemented method for generating at least one perspective-corrected overlay for at least one 2D image representing an environment of a vehicle for at least one imaging system of the vehicle according to the first aspect of the invention.

In a step 101, 3D data of at least one part of the vehicle's environment represented in the 2D image is received. The environment is especially to the rear of the vehicle. Displaying the 2D image to a driver while reverse driving allows the driver to control the driving operation without looking back and furthermore, to be particularly aware of that part of the environment obscured by the vehicle body from the driver's field of view.

In a step 103 at least one predicted path of travel of the vehicle's wheels is determined, based on the steering angle which preferably is the current steering angle of the vehicle. This predicted path of travel can be conventionally used as overlay in the 2D image. It is well-known for the person skilled in the art how to determine such a conventional predicted path of travel and, therefore, it is not necessary to explain it in further details here.

When the predicted path of travel is displayed as overlay in the 2D image it forms together with the 2D image a combined 2D image.

Figure 2:
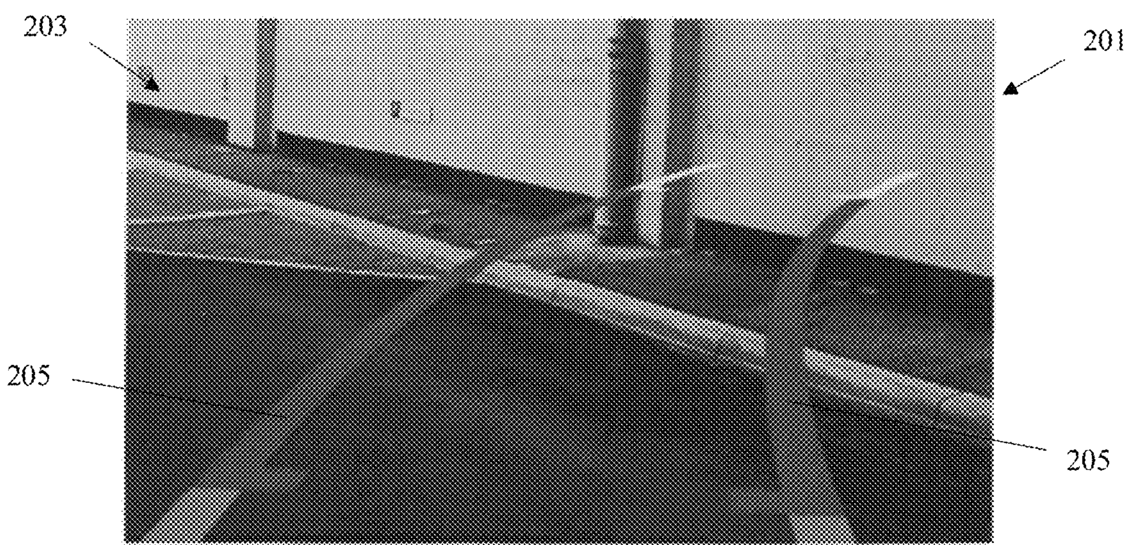
FIG. 2 shows a first 2D image with an overlay in form of a predicted path of travel.

FIG. 2 shows such a combined 2D image 201 of a first scenario which is combined by the 2D image 203 of the environment (of the first scenario) to the rear of the vehicle and the predicted path of travel 205 for both, the left-side wheels of the vehicle and the right-side wheels of the vehicle. As can be taken from FIG. 2, in the combined 2D image 201 the predicted path of travel is statically projected onto the 2D image 203 without consideration of the real ground topography.

It is noted in general that it is not necessarily required that the combined 2D image is actually generated for the method properly operating. It might also be sufficient that the relationship between the predicted path of travel and the 2D image (and/or the respective 2D image data) is known or obtainable.

Based on the predicted path of travel, the 2D image data (which 2D image data represents the 2D image) and the 3D data an adapted path of travel is obtained. This adapted path of travel corresponds to at least one perspective-corrected sub-section of the predicted path of travel.

Obtaining the adapted path of travel comprises in a step 105 determining the sub-section of the predicted path of travel based on the predicted path of travel and/or 3D data. The start point of the sub-section of the predicted path of travel might correspond to the start point of the predicted path of travel. The end point of the sub-section of the predicted path of travel might be determined based on the location of the first obstacle along the predicted path of travel from near to distant intersecting with the predicted path of travel. In this regard the 3D data indicates obstacles in the environment possibly intersecting with the predicted path of travel and an obstacle is identified as intersecting with the predicted path of travel if the obstacle has at least one expansion, and/or at least one location exceeding at least one predefined threshold value concerning, respectively, the expansion, and the location. This means that the 3D data might indicate many obstacles but inly some of them or even none of them are actually intersecting dependent on e.g. the threshold values and other definitions in this regard.

Of course, if there is no obstacle identified being intersecting with the predicted path of travel, the sub-section of the predicted path of travel might comprises the entire predicted path of travel and the sub-section of the predicted path of travel is identical to the entire predicted path of travel. However, determining the sub-section allows to terminate the finally obtained adapted path of travel at obstacles which are not passable by the vehicle, e.g. because they are too large. Of course, this step can be also regarded as optional since the overlay would still appear as also hugging the large obstacle. However, it might be improving the understanding of the driver that the obstacle represents an impassable region by means of determining an appropriate sub-section.

Obtaining the adapted path of travel comprises in a step 107 fragmenting the sub-section of the predicted path of travel. This in turn comprises dividing the (sub-section of the) predicted path of travel into fragments. In this embodiment the fragments are equally-distributed along the (sub-section of the) predicted path of travel and are rectangular-shaped.

Figure 3:
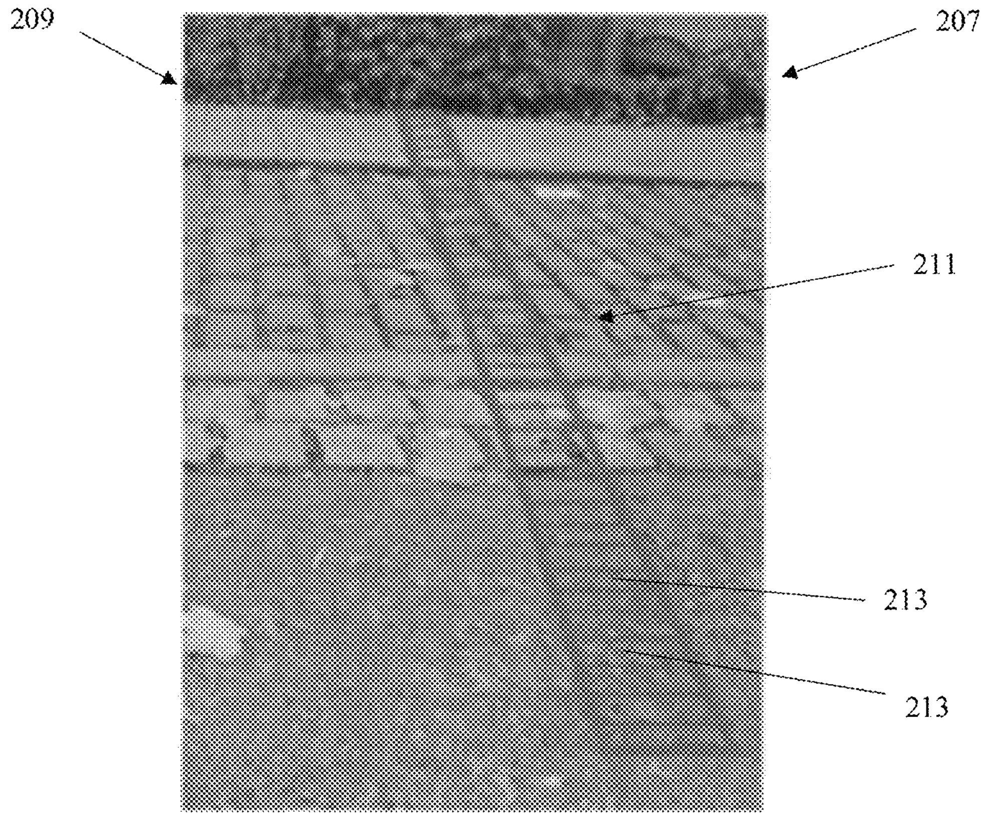
FIG. 3 shows a second 2D image with an overlay in form of a fragmented predicted path of travel.

FIG. 3 shows a second combined 2D image 207 of a second scenario which is combined by the 2D image 209 of the environment (of the second scenario) to the rear of the vehicle and a predicted path of travel 211, however in fragmented manner. Obviously, in FIG. 3 only a single predicted path of travel 211 is shown contrary to the situation in FIG. 2 described above. In FIG. 3 only two of a plurality of fragments 213 of the predicted path of travel are labeled.

Obtaining the adapted path of travel comprises further in a step 109 determining the adapted path of travel based at least on the 3D data associated via the 2D image data of the 2D image with each fragment. This is accomplished in a step 109*a* (which might be regarded as a sub step of step 109) by determining, for each fragment, the collection of 3D data corresponding to the part of the environment represented in the 2D image (or in the combined 2D image) enclosed by the boundaries of the fragment.

Thus, once the area in the 2D image enclosed by the boundaries of the fragment is determined, it is for example possible to determine the collection of 3D data since the 2D image data (representing the 2D image) is associated with the respective 3D data.

In a step 109*b* (which might be regarded as a sub step of step 109), for each fragment, at least one averaged value of, respectively, a slope and a height (i.e. certain properties) of the part of the environment corresponding to the collection of 3D data of that fragment is determined based at least on the collection of 3D data. In other words, in this embodiment a local averaged value of, respectively, the two properties (slope and height) of the part of the environment which is covered by the 3D data (hence, covered by the fragment in the 2D image/combined 2D image) is determined.

In a step 109*c* (which might be regarded as a sub step of step 109), for each fragment, the shape and/or the location of the fragment is adapted for creating the perspective-corrected appearance of the fragment when displayed as overlay in the 2D image. In this embodiment, that adaption is based on the averaged values but it is also possible to alternatively or in addition incorporate for example the 2D data, the location of the fragment or the extension of the fragment in the process of adapting the fragment. This adapting, in other words, basically means that the 2D style of the fragment, which can be regarded as part of the predicted path of travel, is adapted such that it appears that the fragment, when displayed in the 2D image as overlay, follows or hugs the contour (i.e. the topography), of the environment in that area of the 2D image.

In a step 109*d* (which might be regarded as a sub step of step 109), for each fragment, at least one normal vector associated with the part of the environment corresponding to the collection of 3D data of that fragment is determined. This determination is based on the collection of 3D date of that fragment and/or on the averaged value (determined in the step 107*b*). In other words, if for example the slope of the part of the environment represented by the collection of 3D data (i.e. covered by the fragment in the 2D image) is determined, based on that value the normal vector can be calculated.

Still in step 109*d*, next, at least one angle between that normal vector and at least one reference vector is calculated. For example, the reference vector might correspond to light rays emanating from a virtual light source. For example the light rays might be directional, i.e. the direction of the light does not depend on the position of the illuminated region.

Figure 4:
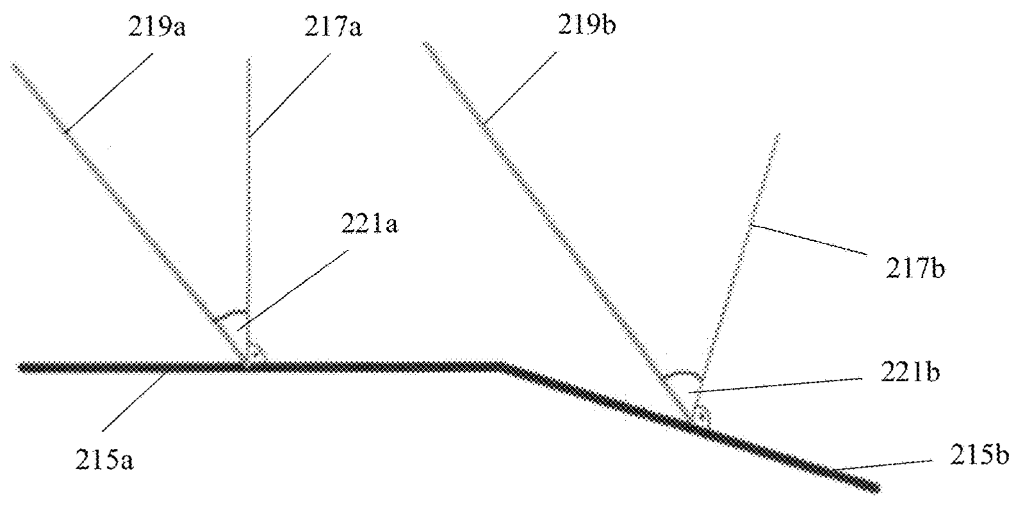
FIG. 4 shows an illustration of two areas with incident light rays.

FIG. 4 illustrates the situation for calculation of the angle. There are two areas 215*a* and 215*b* of the environment which are represented by the 3D data of two adjacent fragments. Each area 215*a* and 215*b* has a normal vector 217*a* and 217*b*. Furthermore there are two directional light rays 219*a*, 219*b* impinging on the areas 215*a* and 215*b*, respectively. Obviously the light rays 219*a* and 219*b* are parallel to each other since the light rays are assumed to be directional. Between the normal vector 217*a* and 217*b* and, respectively, the light ray 219*a* and 219*b* there is an angle 221*a* and 221*b*, respectively. Of course, the areas 215*a* and 215*b* used for determining the respective normal vector might be of simplified type compared to the real part of the environment they correspond to. For example the areas 215*a*, 215*b* only approximate the respective part of the environment by an appropriate plane based at least on the averaged value. But also other approaches might be employed in addition or alternatively in order to determine the normal vector associated with the environment represented by the collection of 3D data of each fragment.

In a step 109*e* (which might be regarded as a sub step of step 109), for each fragment, the brightness of the color of the fragment is adapted based on the cosine of the angle calculated in step 109*d*.

In a step 109*f* (which might be regarded as a sub step of step 109), for each fragment, of the fragment is adapted based on the location of the fragment within the adapted path of travel. This might be in the present embodiment equivalent to setting the hue of the color of the fragment based on the distance between the fragment and the vehicle in the 2D image. Even if the vehicle is not shown in the 2D image, the person skilled in the art might understand that in such as case the distance is calculated based on the hypothetical position of the vehicle located outside of the 2D image.

The steps 109*a*-109*f* are repeated for each fragment unless all fragments have been processed and adapted, which then means that the adapted path of travel is obtained. In other words, each fragment is adapted (e.g. its shape, hue of color and brightness of color) so that the predicted path of travel is finally transformed to the adapted path of travel.

The adapted path of travel in this embodiment corresponds to the entirety of the adapted fragments. And if the adapted path of travel is displayed as overlay in the 2D image it appears to follow at least area by area at least one surface topography of the environment in the 2D image and it also appears to terminate at an obstacle representing a boundary of a region passable for the vehicle.

In a step 111 the 2D image is displayed with the adapted path of travel as overlay. In addition, it would be possible that also at least one visualization of the end of the adapted path of travel in form of at least one line-shaped marking element is displayed. The marking element then might hug the contour of the respective obstacle which defines the end of the adapted path of travel. It would be possible that the marking element is not displayed if there is no obstacle present which intersects with the predicted path of travel.

Figure 5:
FIG. 5 shows a third 2D image with an overlay in form of an adapted path of travel.

FIG. 5 shows a third 2D image 223 with an overlay in form of an adapted path of travel 225. This representation might be subject to displaying on a display unit to the driver of the vehicle comprising the respective imaging system during reverse driving. As obvious from FIG. 5, the adapted path of travel 225 appears to follow the topography of the environment, especially indicated by the bend 227 of the adapted path of travel 225 where the underground changes its slope. Furthermore, it is obvious that both, the hue and the brightness of the color of the adapted path of travel, is adapted for different sections 229*a*-229*d* based on the orientation and/or distance of the respective section 229*a*-229*d* from the vehicle (which is in FIG. 4 located outside at the bottom of FIG. 4). A single section 229*a*-229*d* might comprise one or more fragments of identical shade and/or shape.

There is no obstacle in the path of travel, so that the adapted path of travel ends at some maximum length to be displayed to the driver.

Further, in FIG. 5 a color map is shown, which is subdivided into three parts, which corresponds to the section 229*a*, the entirety of sections 229*b* and 229*c* and eventually for section 229*d*. It is preferred that in the color map shown in FIG. 5 a color code is displayed to the driver or passenger. The section 229*a* is shown in red color, sections 229*b* and 229*c* are shown in yellow color and/or section 229*d* is shown in green color. Such basic color information in the map can indicate in an convenient way for the driver of a vehicle certain distance ranges from/to the vehicle. In this example red indicates a close proximity, while on the other hand green corresponds a far proximity to the vehicle. Additionally, this color map may be adjusted by its hue and/or brightness and/or shade as described above and shown in FIG. 5 to follow the topography of the environment.

Figure 6:
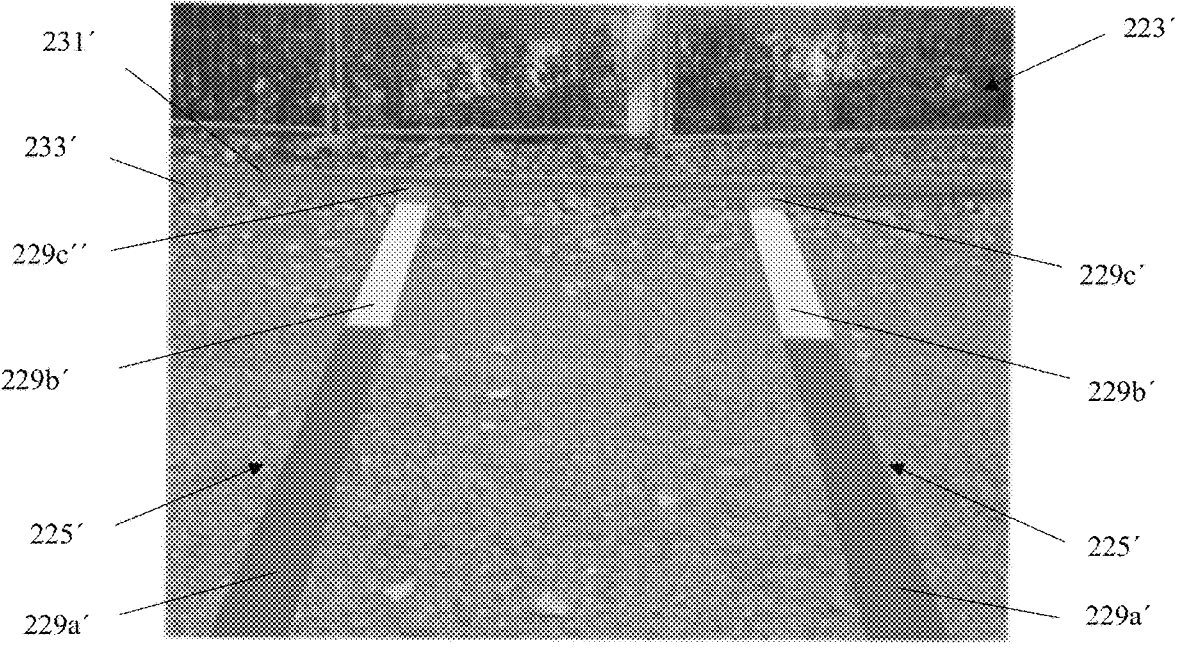
FIG. 6 shows a fourth 2D image with an overlay in form of an adapted path of travel in combination with a line-shaped marking element.

FIG. 6 shows a fourth 2D image 223' with an overlay in form of an adapted path of travel 225' in combination with a line-shaped marking element 231'. Features shown in FIG. 6 which are in terms of functionality similar to features discussed above with respect to FIG. 5 are labeled with the same reference signs but dashed and are, therefore, not discussed in detail again. The marking element 231' improves visibility of the curb 233'. Due to the curb 233', the adapted path of travel 225' is only a sub-section of the predicted path of travel so that the adapted path of travel 225' ends with the curb 233'. For example, the method might have determined based on the vehicle's clearance and/or one or more threshold values that the curb 233' is impassable for the vehicle.

Figure 7:
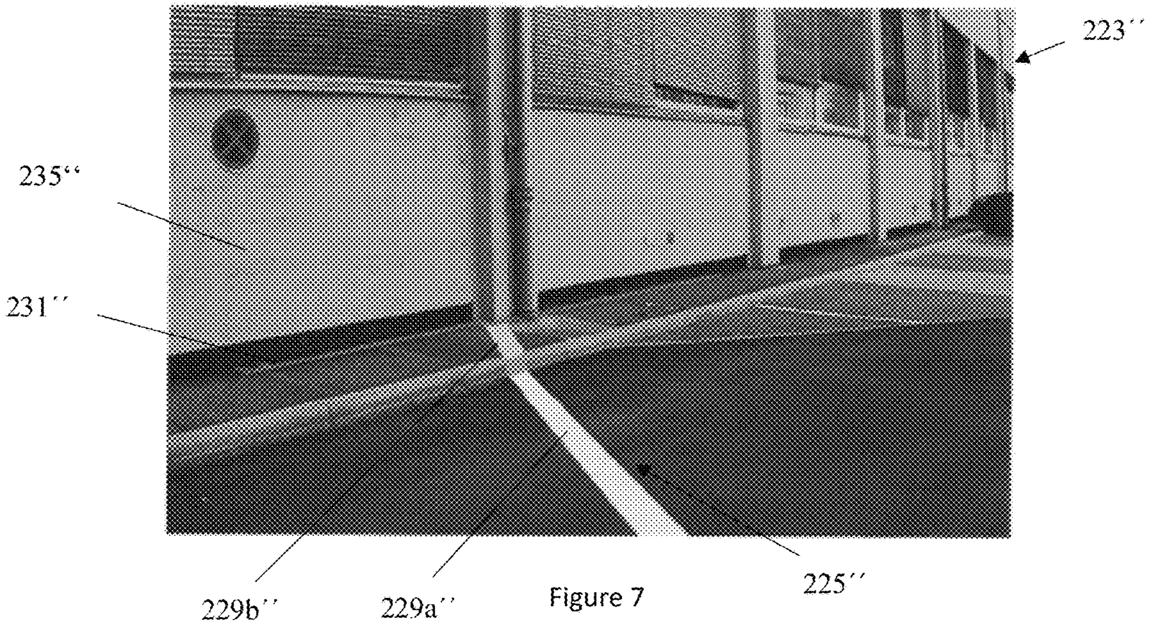
FIG. 7 shows a fifth 2D image with an overlay in form of an adapted path of travel in combination with a line-shaped marking element.

FIG. 7 shows a fifth 2D image 223" with an overlay in form of an adapted path of travel 225" in combination with a line-shaped marking element 231'. Features shown in FIG. 7 which are in terms of functionality similar to features discussed above with respect to FIG. 5 and/or FIG. 6 are labeled with the same reference signs but doubled dashed and are, therefore, not discussed in detail again. The marking element 231" improves visibility of the wall 235". Due to the wall 235", the adapted path of travel 225" is only a subsection of the predicted path of travel so that the adapted path of travel 225" ends with the wall 235". Thus, preferably the predicted path of travel 225" appears to terminate, by following the topography of the environment in the 2D image, at the obstacle in form of the wall 235".

Figure 8:
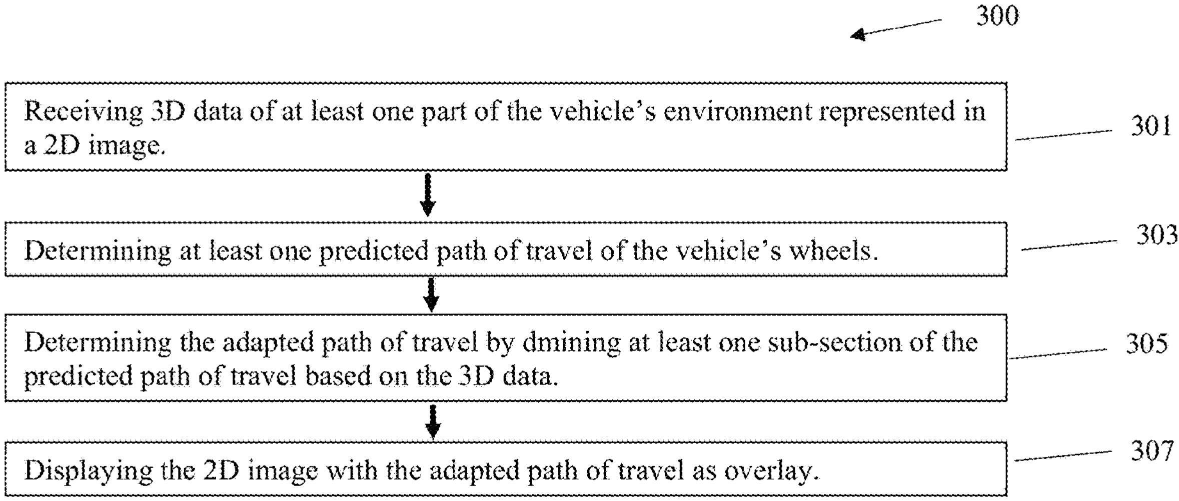
FIG. 8 shows a flow chart of a method according to the second aspect of the invention.

FIG. 8 shows a flow chart 300 for a computer-implemented method for generating at least one trimmed overlay for at least one 2D image representing an environment of a vehicle for at least one imaging system of the vehicle according to the second aspect of the invention.

The method 300 comprises the steps 301, 303, 305 and 307 which basically correspond to the steps 101, 103, 105 and 111, respectively, of the method 100 according to the first aspect of the invention described above with reference to the flow chart of FIG. 1.

It is, therefore, not required to explain all these steps here again but reference is made to the respective passages provided above with respect to method 100 which apply here mutatis mutandis, too.

The method of flow chart 300, thus, determines the adapted path of travel based on a predicted path of travel and 3D data of the environment of the vehicle with essentially the same result as the method of flow chart 100 above do, but without adapting the predicted path of travel such that it appears to follow the topography.

The features disclosed in the claims, the specification, and the drawings may be essential for different embodiments of the claimed invention, both separately or in any combination with each other.

REFERENCE SIGNS

100 Flow chart
101 Step
103 Step
105 Step
107 Step
109 Step
109*a* Step
109*b* Step
109*c* Step
109*d* Step
109*e* Step
109*f* Step
111 Step
201 Combined 2D image
203 2D image
205 Path of travel
207 Combined 2D image
209 2D image
211 Path of travel
213 Fragment
215*a*, 215*b* Area
217*a*, 217*b* Normal vector
219*a*, 219*b* Light Ray
221*a*, 221*b* Angle
223, 223', 223" 2D image
225, 225' 225" Path of travel
227 Bend
229*a*, 229*b*, 229*c*, 229*d* Section
229*a'*, 229*b'*, 229*c'* Section
229*a"*, 229*b"* Section
231', 231" Marking element
233' Curb
235" Wall
300 Flow chart
301 Step
303 Step
305 Step
307 Step

The invention claimed is:

1. A computer-implemented method for generating a perspective-corrected overlay or trimmed overlay for a 2D image representing an environment of a vehicle for an imaging system of the vehicle, comprising:

receiving 3D data of at least one part of the vehicle's environment represented in the 2D image, the 3D data including physical characteristics of a three-dimensional (3D) obstacle within the environment;

determining, based at least in part on a steering angle of the vehicle, a predicted path of travel of the vehicle's wheels which when displayed as an overlay in the 2D image forms together with the 2D image a combined 2D image;

obtaining, based at least in part on the 3D data, an adapted path of travel having a direction or length of travel different from the predicted path of travel, the adapted path of travel corresponding to a perspective-corrected sub-section or trimmed sub-section of the predicted path of travel and which when displayed as the overlay in the 2D image appears to follow a surface topography of the environment in the 2D image or appears to terminate at the 3D obstacle if the 3D obstacle is impassable for the vehicle.

2. The computer-implemented method of claim 1, wherein obtaining the adapted path of travel further comprises:

obtaining the adapted path of travel further based on at least one of the 2D image, 2D image data of the 2D image, or the steering angle;

fragmenting at least the perspective-corrected sub-section or trimmed sub-section of the predicted path of travel into at least two fragments; and determining the adapted path of travel based at least in part on the 3D data associated via the 2D image with at least one fragment, wherein the step of fragmenting comprises dividing the perspective-corrected sub-section or trimmed sub-section of the predicted path of travel into at least two fragments being equally-distributed across or along the predicted path of travel or being rectangular-shaped.

3. The computer-implemented method of claim 2, wherein determining the adapted path of travel comprises:

generating the combined 2D image by combining the 2D image and the predicted path of travel in at least one combined image; and determining, for each fragment, based at least in part on the combined 2D image, a collection of 3D data corresponding to the part of the environment represented in the combined 2D image that is enclosed by boundaries of the fragment.

4. The computer-implemented method of claim 2, wherein determining the adapted path of travel comprises:

determining, for each fragment, based at least on the collection of 3D data, an averaged value of a certain property of a part of the environment corresponding to the collection of 3D data of that fragment; or adapting, for each fragment, a shape and location of the fragment in a coordinate system of the 2D image or of the combined 2D image, based at least on the averaged value or on the 3D data for creating the perspective-corrected appearance of the fragment when displayed as an overlay in the 2D image.

5. The computer-implemented method of claim 4, wherein determining the adapted path of travel comprises:

adapting, for each fragment, a hue of a color of the fragment based on (i) the averaged value, (ii) the location of the fragment within the adapted path of travel, or (iii) based on a distance between the fragment and the vehicle in the 2D image or in the combined 2D image; or repeating the adapting steps for each fragment unless all fragments have been adapted so that the adapted path of travel is obtained.

6. The computer-implemented method of claim 4, wherein determining the adapted path of travel further comprises:

determining, for each fragment, a normal vector associated with the part of the environment corresponding to the collection of 3D data of that fragment, based on the collection of 3D data or the averaged value of that fragment, and calculating an angle between the normal vector and a reference vector, the reference vector pointing in a direction corresponding to a light ray emanating from a light source, wherein (i) the light source is a virtual light source, (ii) the light ray emanating from the light source is a directional light ray, (iii) the light source has a direction, (iv) the light source has a position above a scene shown in the 2D image, or (v) the light ray has a direction aligned to a sunlight direction at a time of processing.

7. The computer-implemented method according to claim 3, wherein determining the adapted path of travel further comprises:

adapting, for each fragment, at least one of a shading of the fragment, and a brightness of a color of the fragment based at least in part on the averaged value, on the angle, or within a range bounded by a minimum brightness value or a maximum brightness value.

8. The computer-implemented method of claim 1, wherein obtaining the adapted path of travel further comprises, determining a start point of the perspective-corrected sub-section or trimmed sub-section of the predicted path of travel close to the vehicle and an end point of the perspective-corrected sub-section or trimmed sub-section of the predicted path of travel distant to the vehicle, based at least on the 3D data, and the predicted path of travel, wherein (a) the start point of the perspective-corrected sub-section or trimmed sub-section of the predicted path of travel corresponds to the start point of the predicted path of travel, (b) the 3D data and auxiliary data indicates obstacles in the environment intersecting with the predicted path of travel, (c) the endpoint of the perspective-corrected sub-section or trimmed sub-section of the predicted path of travel is determined based on a location of a first obstacle along the predicted path of travel from near to distant intersecting with the predicted path of travel at the location of the first obstacle intersecting with the predicted path of travel, (d) an obstacle is identified as intersecting with the predicted path of travel if the obstacle has at least one expansion, at least one height, at least one orientation and/or at least one location exceeding at least one predefined threshold value, or (e) the ground's slope, the angle of driving slope and/or the vehicle's ground clearance is taken into account for identifying an intersecting obstacle.

9. The computer-implemented method of claim 1, wherein obtaining the adapted path of travel further comprises the step of adapting a determined sub-section of the predicted path of travel based on object or scene classification relying on the 2D image data, the 3D data and/or the auxiliary data.

10. The computer-implemented method of claim 3, wherein the perspective-corrected sub-section or trimmed sub-section of the predicted path of travel is identical to the entire predicted path of travel; or the certain property of the part of the environment corresponding to the collection of 3D data comprises a slope with respect to a reference slope, an orientation, a height, a location, or an expansion of the part of the environment.

11. The computer-implemented method of claim 1, wherein obtaining the adapted path of travel further comprises:

determining a start point of the perspective-corrected or trimmed sub-section of the predicted path of travel close to the vehicle or an end point of the perspective-corrected or trimmed sub-section of the predicted path of travel distant to the vehicle, based at least in part on the 3D data and/or the predicted path of travel;

wherein the 3D data indicates obstacles in the environment intersecting with the predicted path of travel and the end point of the perspective-corrected or trimmed sub-section of the predicted path of travel is determined based on a location of a first obstacle along the predicted path of travel from near to distant intersecting with the predicted path of travel at the location of the first obstacle intersecting with the predicted path of travel.

12. The computer-implemented method of claim 11, wherein the start point of the perspective-corrected sub-section or trimmed sub-section of the predicted path of travel corresponds to the start point of the predicted path of travel.

13. The computer-implemented method of claim 11, wherein an obstacle is identified as intersecting with the predicted path of travel if the obstacle has at least one expansion, at least one height, at least one orientation and/or at least one location exceeding at least one predefined threshold value concerning, respectively, the expansion, the height, the orientation and the location.

14. The computer-implemented method of claim 11, wherein, the ground's slope, the angle of driving slope and/or the vehicle's ground clearance is taken into account for identifying an intersecting obstacle; or obtaining the adapted path of travel further comprises the step of adapting a determined sub-section of the predicted path of travel based on object and/or scene classification relying on the 2D image data, the 3D data and/or the auxiliary data.

15. The computer-implemented method of claim 1, further comprising:

(i) displaying the 2D image with the adapted path of travel as overlay on at least one display unit of the vehicle, wherein the display unit comprises at least one monitor, at least one head-up display, at least one projector or at least one touch display; or (ii) displaying further at least one visualization of at least one end point of the adapted path of travel, the visualization being in form of at least one marking element.

16. The computer-implemented method of claim 1, further comprising receiving the 2D image data, wherein (i) the 2D image is represented by the 2D image data, (ii) the 2D image data is sampled 2D image data, (iii) the auxiliary data is sampled auxiliary data, (iv) the 2D image data is received from at least one first data source, (v) the auxiliary data is received from at least one second data source, (vi) the 2D image data is associated with the respective 3D data, and each sample of the sampled 2D image data is associated with at least one sample of the sampled 3D data, or (vii) at least one part of the auxiliary data is based on the 3D data or is identical to at least one part of the 3D data.

17. The computer-implemented method of claim 16, wherein, the first data source or the second data source includes at least one time-of-flight (TOF) sensor, at least one LIDAR sensor, at least one ultrasonic sensor, at least one radar sensor, or at least one camera sensor, or the first and second data sources are at least partly identical.

18. The computer-implemented method of claim 1, wherein the at least one part of the vehicle's environment represented in the 2D image is an environment to the rear or the front of the vehicle; or the steering angle is a current steering angle.

19. A data processing device comprising means for carrying out the steps of the method of claim 1.

20. A motor vehicle comprising at least one imaging system and a data processing device according to claim 19.

21. The computer-implemented method of claim 1, wherein (i) the 3D data is sampled 3D data; or (ii) the 3D data is received from at least one first data source.

22. The motor vehicle according to claim 21, wherein the motor vehicle further comprises (a) at least one time-of-flight (TOF) sensor, (b) at least one LIDAR sensor, (c) at least one ultrasonic sensor, (d) at least one radar sensor, (e) at least one camera sensor adapted to evaluate the data of the camera sensor by means of at least one structure from motion approach, at least one scene classification approach or at least one object classification approach, (f) at least one stereo camera, (g) at least two camera sensors arranged for stereo vision and/or (h) at least one display unit.

23. The computer-implemented method of claim 16, wherein, the first data source includes at least one time-of-flight (TOF) sensor, at least one LIDAR sensor, at least one ultrasonic sensor, at least one radar sensor, or at least one camera sensor.

24. The computer-implemented method of claim 1, wherein a determination that the obstacle is impassable for the vehicle includes comparing the physical characteristics of the obstacle to threshold physical characteristics.

25. The computer-implemented method of claim 1, wherein 2D image data and the 3D data are received from:

one time of flight (TOF) sensor for both the 2D image data and the 3D data;

one TOF sensor for the 3D data and one camera sensor for the 2D image data;

two camera sensors for both the 2D image data and the 3D data;

one camera sensor in combination with motion data for both the 2D image data and the 3D data;

one camera sensor in combination with scene and/or object classification data for both the 2D image data and the 3D data;

one or more ultrasonic sensor for the 3D data and one camera sensor for the 2D image data;

one Lidar sensor for the 3D data and one camera sensor for the 2D image data; or one radar sensor for the 3D data and one camera sensor for the 2D image data.

26. The computer-implemented method of claim 25, further comprising deriving the 3D data from the 2D image data.

27. The computer-implemented method of claim 1, wherein the 3D obstacle is a curb, bump, wall, or other 3D obstacle in a path of travel of the vehicle.

* * * * *